US007385970B1

(12) United States Patent
Chow et al.

(10) Patent No.: US 7,385,970 B1
(45) Date of Patent: Jun. 10, 2008

(54) METHOD AND APPARATUS FOR BALANCING BANDWIDTH AMONG MULTIPLE PORTS OF A NETWORK ELEMENT

(75) Inventors: Felix Chow, Sunnyvale, CA (US); Michael McClary, Newark, CA (US)

(73) Assignee: Redback Networks, Inc., San Jose, CA (US)

( * ) Notice: Subject to any disclaimer, the term of this patent is extended or adjusted under 35 U.S.C. 154(b) by 1262 days.

(21) Appl. No.: 10/080,869

(22) Filed: Feb. 21, 2002

Related U.S. Application Data

(60) Provisional application No. 60/340,982, filed on Dec. 7, 2001.

(51) Int. Cl.
    *H04L 12/28* (2006.01)
(52) U.S. Cl. ............... 370/389; 370/252; 370/253; 370/235; 370/236
(58) Field of Classification Search ............... 370/252, 370/253, 235, 236, 389
    See application file for complete search history.

(56) References Cited

U.S. PATENT DOCUMENTS

| | | | |
|---|---|---|---|
| 4,667,324 A | | 5/1987 | Graves |
| 4,736,363 A | | 4/1988 | Aubin et al. |
| 4,866,609 A | * | 9/1989 | Calta et al. .................... 710/54 |
| 5,062,104 A | * | 10/1991 | Lubarsky et al. ........... 370/466 |
| 5,132,966 A | * | 7/1992 | Hayano et al. ............. 370/233 |
| 5,159,595 A | | 10/1992 | Flanagan et al. |
| 5,359,593 A | * | 10/1994 | Derby et al. ................ 370/234 |
| 5,436,898 A | * | 7/1995 | Bowen et al. ............... 370/352 |
| 5,506,844 A | * | 4/1996 | Rao ........................... 370/468 |
| 5,541,912 A | * | 7/1996 | Choudhury et al. ........ 370/412 |
| 5,608,733 A | | 3/1997 | Vallee et al. |
| 5,703,871 A | * | 12/1997 | Pope et al. .................. 370/248 |
| 5,877,812 A | * | 3/1999 | Krause et al. ........... 375/240.25 |
| 6,032,211 A | * | 2/2000 | Hewitt ...................... 710/107 |
| 6,118,761 A | * | 9/2000 | Kalkunte et al. ........... 370/229 |
| 6,205,142 B1 | | 3/2001 | Vallee |

(Continued)

OTHER PUBLICATIONS

Tarek N. Saadawi et al., *Local Area Network Protocols and Standards*, Fundamentals of Telecommunication Networks, 1994, Table of Contents (pp. vii-xiv) and Chapter 8 (pp. 279-316), John Wiley & Sons Inc., New York, NY.

(Continued)

*Primary Examiner*—Edan Orgad
*Assistant Examiner*—Andrew C. Lee
(74) *Attorney, Agent, or Firm*—Blakely, Sokoloff, Taylor & Zafman

(57) ABSTRACT

Data is transferred on a first port during a current cycle until a predetermined number of bytes less an overshoot value for the first port has been transferred on the first port. The transfer of data continues on the first port during the current cycle until a complete packet has been transferred on the first port. An overshoot value for the first port is updated based on the number of bytes transferred on the first port. In one embodiment, a pair of ports are sequentially selected from a plurality of pairs of ports. The pair of ports comprises a port connected to a first interface and a port connected to a second interface. Data is transferred on the port connected to the first interface during a current cycle. Data is transferred on the port connected to the second interface during the current cycle.

48 Claims, 10 Drawing Sheets

U.S. PATENT DOCUMENTS

| | | | |
|---|---|---|---|
| 6,366,980 B1 * | 4/2002 | Haines et al. | 711/112 |
| 6,456,590 B1 * | 9/2002 | Ren et al. | 370/229 |
| 6,466,591 B1 * | 10/2002 | See et al. | 370/535 |
| 6,493,317 B1 * | 12/2002 | Ma | 370/237 |
| 6,553,036 B1 * | 4/2003 | Miller et al. | 370/462 |
| 6,810,031 B1 * | 10/2004 | Hegde et al. | 370/351 |
| 6,839,330 B1 * | 1/2005 | Chitre et al. | 370/310.1 |
| 6,879,603 B1 * | 4/2005 | Koenig et al. | 370/535 |
| 6,920,110 B2 * | 7/2005 | Roberts et al. | 370/235 |
| 6,956,847 B2 * | 10/2005 | Heston et al. | 370/353 |
| 7,103,063 B2 * | 9/2006 | Fang | 370/452 |
| 7,106,696 B1 * | 9/2006 | Lim et al. | 370/230.1 |
| 2002/0039364 A1 * | 4/2002 | Kamiya et al. | 370/389 |
| 2002/0110149 A1 * | 8/2002 | Roberts et al. | 370/477 |
| 2006/0233156 A1 * | 10/2006 | Sugai et al. | 370/351 |

OTHER PUBLICATIONS

M. Shreedhar et al., *Efficient Fair Queuing Using Deficit Round Robin,* 1995, pp. 231-242, SIGCOMM Cambridge, MA USA.

Pnakaj K. Jha, "Bandwidth Maximization for SONET/SDH and Direct Data over Optical Networks" Cypress Semiconductor USA, dated Nov. 16, 2000 (26 pgs) http://www.isoc.org/inet2000/cdproceedings/1g/1g_3.htm.

* cited by examiner

METHOD AND APPARATUS FOR BALANCING BANDWIDTH AMONG MULTIPLE PORTS OF A NETWORK ELEMENT

CROSS-REFERENCE TO RELATED APPLICATIONS

The present application claims priority to the provisional filed application entitled METHOD AND APPARATUS FOR BALANCING BANDWIDTH AMONG MULTIPLE PORTS OF A NETWORK ELEMENT, filed on Dec. 7, 2001, Ser. No. 60/340,982, which is also incorporated herein by reference.

FIELD OF THE INVENTION

The invention relates to the field of telecommunications. More specifically, the invention relates to network elements that can balance bandwidth among multiple ports.

BACKGROUND OF THE INVENTION

With the advent of the Internet and the World Wide Web (WWW), the need for high-speed transmission of data including video and audio has continued to increase. Moreover, in addition to the demand for higher bandwidth, there has also been an increased need for ensuring sufficient quality of service for data flows associated with, for example, streaming audio or visual applications. A typical network element, such as, for example, a router, comprises several ports, to store, queue, and transfer data flows. These ports usually take turns transmitting packets from various data flows. Usually, each port will transmit one packet during its turn. These packets will often vary in size. A problem emerges when one port contains many large packets having many bytes of data in each packet and another port contains many small packets having few bytes of data in each packet. In such a circumstance, one port may use a far greater proportion of the network element's limited transmission bandwidth than another port due to more bytes being transferred per packet. This may result in the provision of an unsatisfactory quality of service for the data flows being forced to use a lesser proportion of the network element's bandwidth. Additionally, backlog to starved ports can cause packet truncation and force packet retransmission, further deteriorating the quality of service for associated data flows.

Each port is typically connected to an interface of a network element. A network element may have several such interfaces, each connected to one or more ports. It is the typical practice for all of the ports connected to one interface to transfer packets before the next interface is given a turn to transfer. This may result in undesirably long gaps between bursts of data transmission, which causes some data flows, such as data flows associated with audio or visual applications, to seem to stutter. If the gap in transmission is sufficiently long, a user of an application receiving the data flow may erroneously believe that the application has ceased to function. Using currently existing techniques, the allocation of limited network element bandwidth among ports may in many circumstances become disadvantageously unbalanced.

SUMMARY OF THE INVENTION

A method and apparatus for balancing bandwidth among multiple ports of a network element are described. In an embodiment, data is transferred on a first port during a current cycle until a predetermined number of bytes less an overshoot value for the first port has been transferred on the first port. The transfer of data continues on the first port during the current cycle until a complete packet has been transferred on the first port. An overshoot value for the first port is updated based on the number of bytes transferred on the first port. In one embodiment, if the number of bytes transferred on the first port is greater than the predetermined number of bytes less the overshoot value for the first port, then the overshoot value for the first port is set to the number of bytes transferred on the first port in excess of the predetermined number less the overshoot value for the first port. In one embodiment, if the number of bytes transferred on the first port is not greater than the predetermined number of bytes less the overshoot value for the first port, then the overshoot value for the first port is set to zero.

In one embodiment, a pair of ports are sequentially selected from a plurality of pairs of ports. The pair of ports comprises a port connected to a first interface and a port connected to a second interface. Data is transferred on the port connected to the first interface during a current cycle. Data is transferred on the port connected to the second interface during the current cycle.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings.

DETAILED DESCRIPTION

A method and apparatus for processing data packets of differing protocols across different channels within data signals are described. In the following description, for purposes of explanation, numerous specific details are set forth in order to provide a thorough understanding of the present invention. It will be evident, however, to one skilled in the art that the present invention may be practiced without these specific details.

System Description

Figure 1:
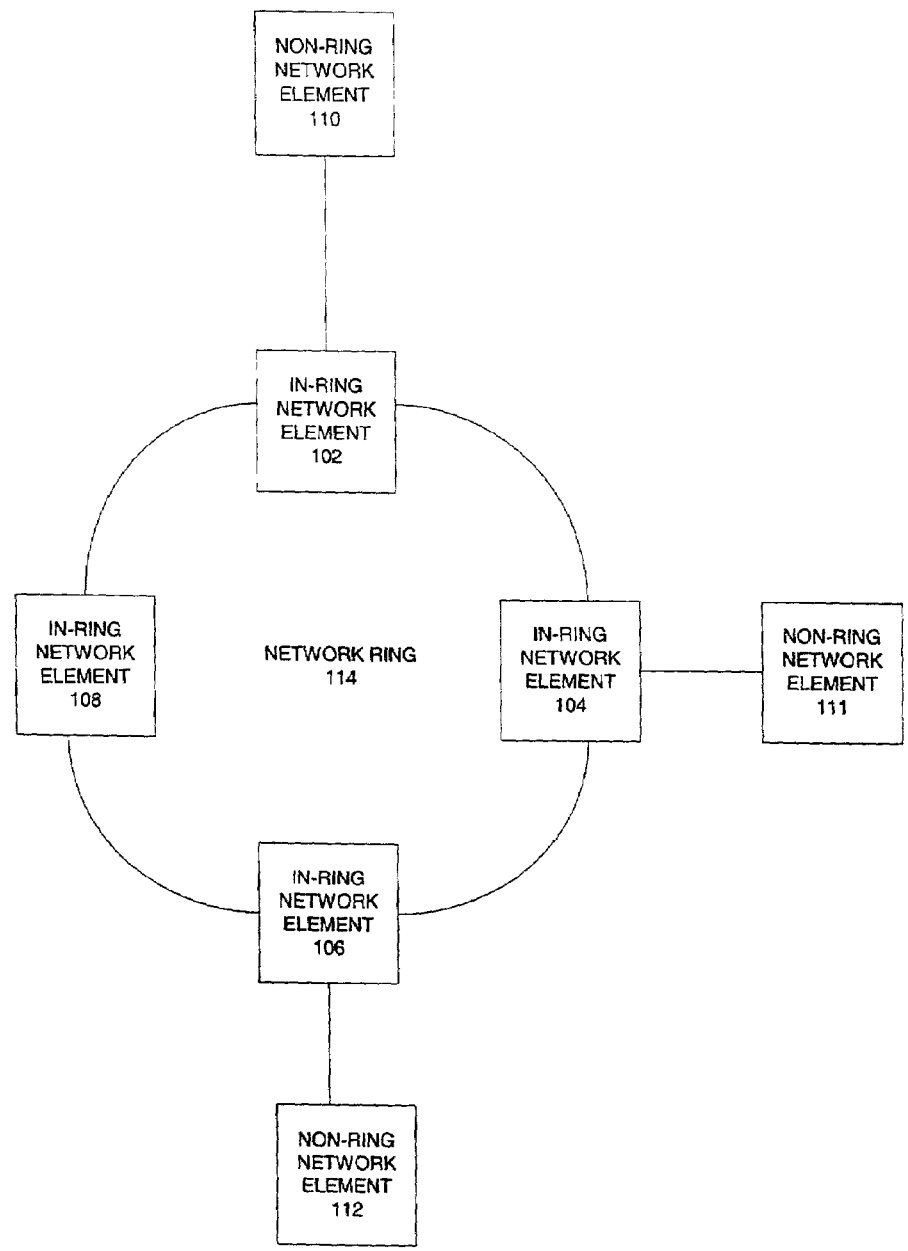
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110-112 can be routers, switches, bridges or other types of network element that switch data across a network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS 1 signals. In one embodiment, data traffic among in-ring network element 102, in-ring network element 104, in-ring network element 106 and in-ring network element 108 includes TDM traffic and packet traffic within a same Time Division Multiplexing (TDM) signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also applies to Wave Division Multiplexing (WDM) networks.

Network Element Description

Figure 2:
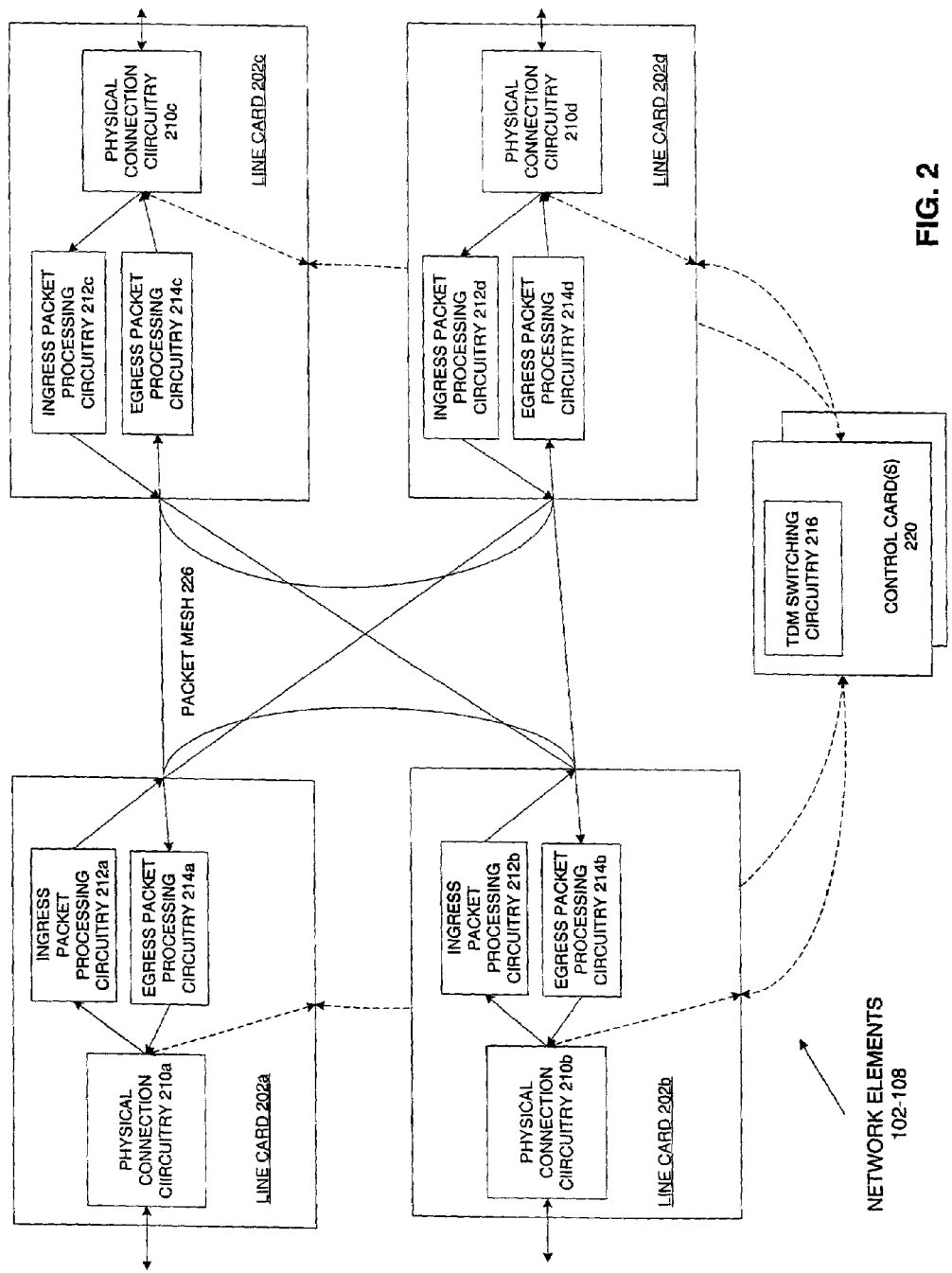
FIG. 2 illustrates portions of in-ring network elements 102-108, according to embodiments of the present invention.

FIG. 2 illustrates portions of in-ring network elements 102-108 (for purposes of FIG. 2, hereinafter "network element 102"), according to embodiments of the present invention. As shown, network element 102 includes line cards 202*a-d* and control card(s) 220, such that control card(s) 220 are coupled to each of line cards 202*a-d*. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202*a-d* are coupled to one another. For example, line card 202*a* is coupled to line cards 202*b-d* through packet mesh 226. However, embodiments of the present invention are not limited to a full mesh for the transmission of packets among line cards 202*a-d*, as any type of switching method that switches based on the addressing scheme described herein can be incorporated into embodiments of the present invention. For example, in one embodiment, line cards 202*a-d* could be coupled together using a switch fabric, such that the line cards are coupled to a control card, which provides for the switching therein.

Line cards 202*a-d* include physical connection circuitry 210*a-d*, ingress packet processing circuitry 212*a-d* and egress packet processing 214*a-d*, respectively. Physical connection circuitry 210*a-d* can be coupled to lines external to network element 102, as shown, which can carry optical and/or electrical signals, which is described in more detail below in conjunction with FIG. 7. In one embodiment, line cards 202*a-d* of network element 102 may be connected to an optical line transmitting SONET OC-N signals. Moreover, in an embodiment, line cards 202*a-d* of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216.

In an embodiment, each line card 202*a-d* can be coupled to four optical and/or electrical lines. In another embodiment, each line card 202*a-d* can be coupled to eight optical and/or electrical lines. However, embodiments of the present invention are not so limited, as a lesser or greater number of optical and/or electrical lines can be coupled to network element 102 through line cards 202a-d. Additionally, physical connection circuitry 210a-d are coupled to ingress packet processing circuitry 212a-d, respectively, such that packet data being received from the optical and/or electrical lines is passed from physical connection circuitry 210a-d to ingress packet processing circuitry 212a-d, respectively. In one embodiment, the packet data is extracted from a TDM signal, which is described in more detail below.

Ingress packet processing circuitry 212a-d is coupled to packet mesh 226. Accordingly, each ingress packet processing circuitry 212a-d is coupled to each egress packet processing circuitry 214a-d, respectively, on other line cards 202a-d through packet mesh 226. Moreover, egress packet processing circuitry 214a-d is respectively coupled to physical connection circuitry 210a-d, such that packet data traffic coming in from packet mesh 226 from ingress packet processing circuitry 212a-d is transmitted from egress packet processing circuitry 214a-d to physical connection circuitry 210a-d, respectively.

Line cards incorporated into embodiments of the present invention are not limited to those illustrated by line cards 202a-d. Moreover, the network elements can have different line card configurations from that shown by line cards 202a-d. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming form an out-of-ring network element can go through the packet mesh to an line card connected to an out-of-ring network element, and then go out of the ring being carried by the protocol of the interface of that egress line card; etc. With regard to the TDM traffic, a second switch fabric (in addition to packet mesh 226) is formed among line cards 202a-d and TDM switching circuitry 216 of control cards 220, as illustrated by the dashed lines in FIG. 2. In particular, physical connection circuitry 210a-d is coupled to TDM switching circuitry 216 for the receiving and transmitting of TDM traffic into and out of network element 102. Accordingly, TDM switching circuitry 216 receive TDM traffic from physical connection circuitry 210a-d and switches this traffic to any of physical connection circuitry 210a-d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first five timeslots of a TDM signal being transmitted out from a first interface of physical connection circuitry 210d.

Operation Of Physical Connection Circuitry 210

Figure 3:
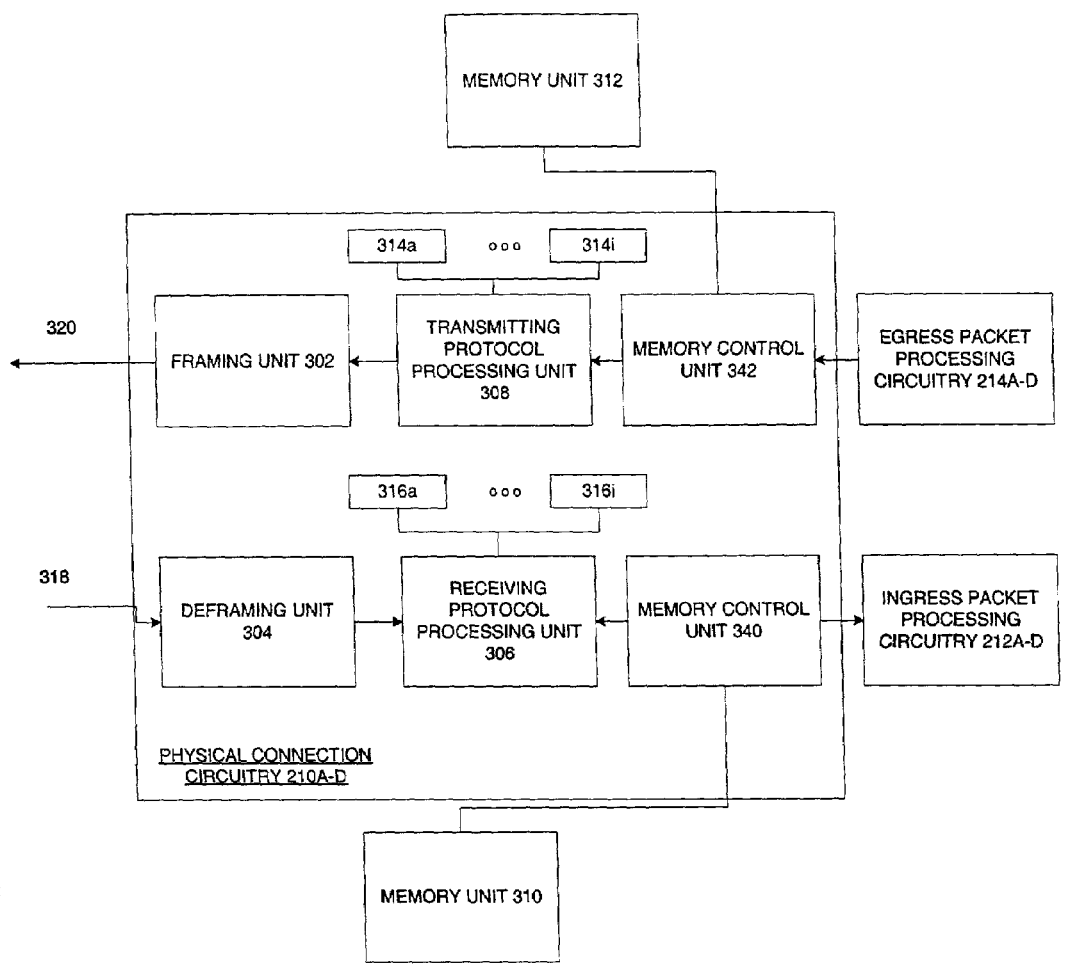
FIG. 3 is a block diagram of physical connection circuitry 210a-d, according to embodiments of the present invention.

FIG. 3 is a more detailed block diagram of physical connection circuitry 210a-d, according to embodiments of the present invention. In particular, physical connection circuitry 210a-d (hereinafter physical connection circuitry 210) includes framing unit 302, deframing unit 304, receiving protocol processing unit 306, transmitting protocol processing unit 308, register arrays 314a-i, register arrays 316a-i, memory control circuit 318 and memory control circuit 320. Additionally, memory control circuit 342 is coupled to memory unit 312, while memory control circuit 340 is coupled to memory unit 310. Memory control circuit 342 is also coupled to egress packet processing circuitry 214a-d (hereinafter egress packet processing circuitry 214), and memory control circuit 340 is coupled to ingress packet processing circuitry 212a-d (hereinafter ingress packet processing circuitry 212).

Memory units 310 and 312 can be any type of read/write memory. In an embodiment, memory units 310 and 312 are random access memories (RAMs). In one such embodiment, memory units 310 and 312 can be static RAMS. Register arrays 314a-i and register arrays 316a-i are also any type of read/write memory. In one embodiment, register arrays 314a-i and register arrays 316a-i are registers.

Deframing unit 304 is coupled to receive signal 318. Additionally, deframing unit 304 is coupled to receiving protocol processing unit 306, which is coupled to memory control unit 340 and register arrays 316a-i. Framing unit 302 is coupled to transmitting protocol processing unit 308, which is coupled to memory control unit 342 and register arrays 314a-i. Moreover, framing unit 302 transmits signal 320 out from physical connection circuitry 210.

Figure 4:
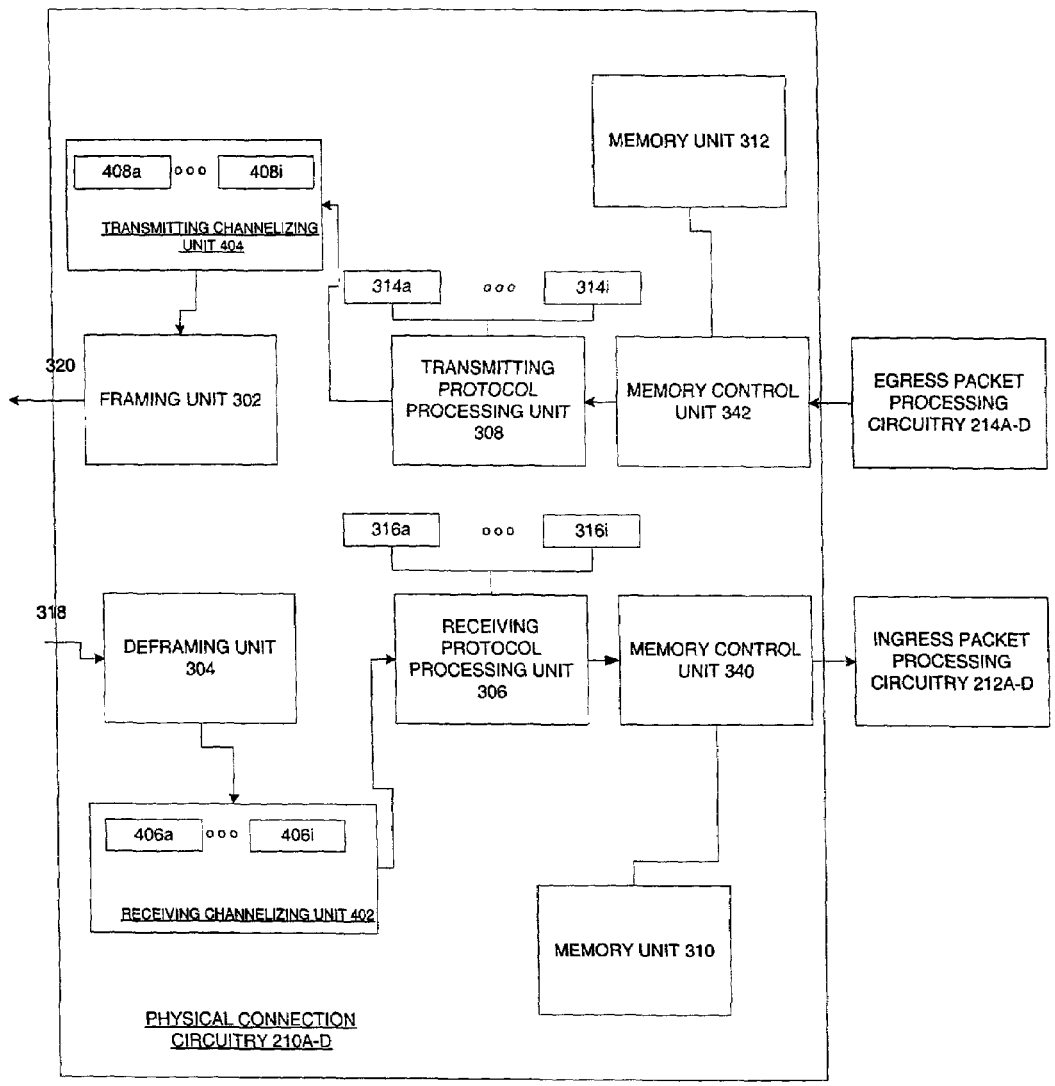
FIG. 4 is a more detailed block diagram of another embodiment of physical connection circuitry 210a-d, according to embodiments of the present invention.

FIG. 4 is a more detailed block diagram of another embodiment of physical connection circuitry 210a-d, according to embodiments of the present invention. Similar to the embodiment illustrated in FIG. 3, the embodiment of physical connection circuitry 210 illustrated in FIG. 4 includes framing unit 302, deframing unit 304, receiving protocol processing unit 306, transmitting protocol processing unit 308, register arrays 314a-i, register arrays 316a-i, memory control circuit 318 and memory control circuit 320. Additionally, physical connection circuitry 210 includes receiving channelizing unit 402 and transmitting channelizing unit 404. Receiving channelizing unit 402 includes buffers 406a-i, and transmitting channelizing unit 404 includes buffers 408a-i. Moreover, in contrast to the embodiment of FIG. 3, memory units 310-312 are internal to physical connection circuitry 210.

Memory control circuit 342 is coupled to memory unit 312, while memory control circuit 340 is coupled to memory unit 310. Memory control circuit 342 is also coupled to egress packet processing circuitry 214a-d (hereinafter egress packet processing circuitry 214), and memory control circuit 340 is coupled to ingress packet processing circuitry 212a-d (hereinafter ingress packet processing circuitry 212).

Memory units 310 and 312 can be any type of read/write memory. In an embodiment, memory units 310 and 312 are random access memories (RAMs). In one such embodiment, memory units 310 and 312 can be static RAMS. Register arrays 314a-i and register arrays 316a-i are also any type of read/write memory. In one embodiment, register arrays 314a-i and register arrays 316a-i are registers.

Deframing unit 304 is coupled to receive signal 318. Additionally, deframing unit 304 is coupled to receiving channelizing unit 402. Receiving channelizing unit 402 is coupled to receiving protocol processing unit 306, which is coupled to memory control unit 340 and register arrays 316a-i. Framing unit 302 is coupled to transmitting channelizing unit 404. Transmitting channelizing unit 404 is coupled to transmitting protocol processing unit 308, which is coupled to memory control unit 342 and register arrays 314a-i. Moreover, framing unit 302 transmits signal 320 out from physical connection circuitry 210. The operation of physical connection circuitry 210 will be described in conjunction with FIGS. 5-9 below. Communications between the outgoing ports of receiving protocol processing unit 306 and the interface of ingress packet processing circuitry 212 will now be described.

Bandwidth Balancing Using Residue Counters

Figure 5:
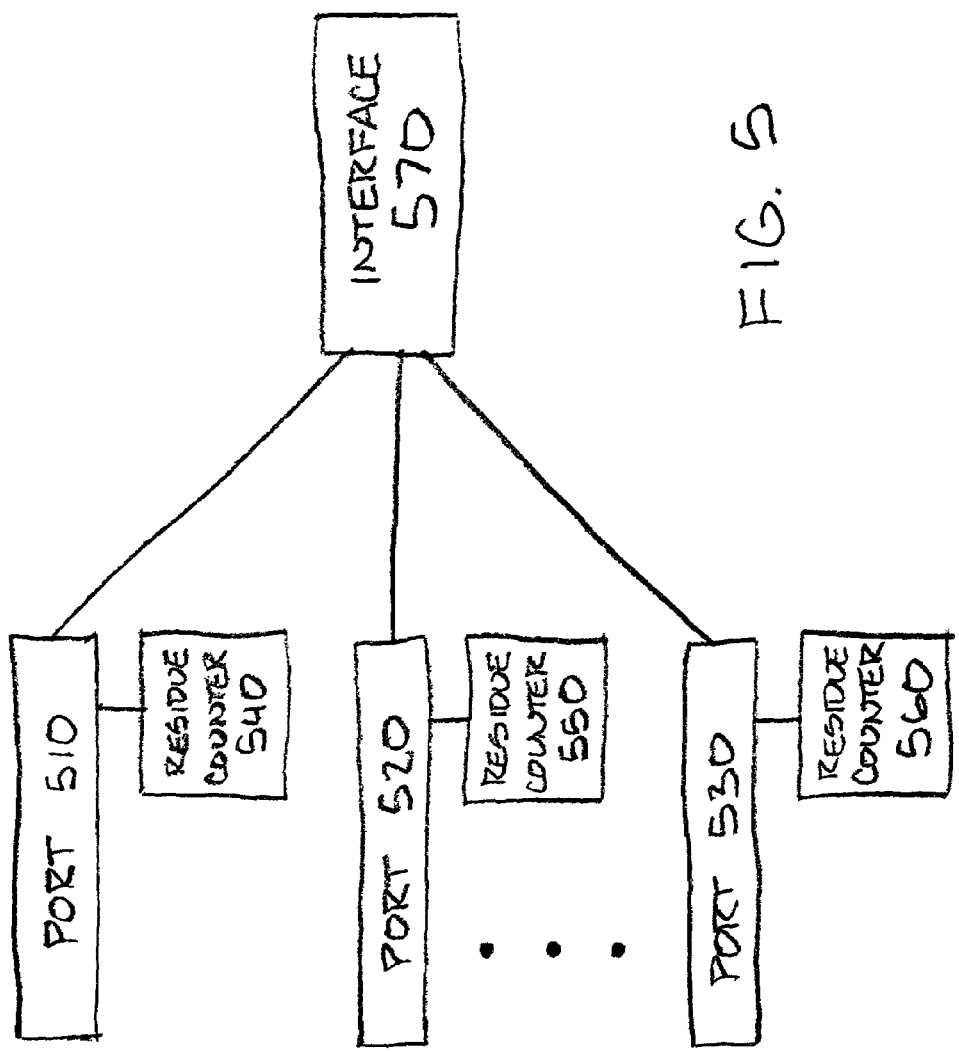
FIG. 5 is a block diagram illustrating ports having residue counters and coupled to an interface according to embodiments of the present invention.

In particular, FIG. 5 is a block diagram illustrating ports having residue counters and coupled to an interface according to embodiments of the present invention. In one embodiment, a port 510 is coupled with a residue counter 540. Other ports may also be present. Each port is associated with a residue counter. A port may include one or more channels. A residue counter is associated with each port. Also shown are residue counter 550 associated with port 520 and residue counter 560 associated with port 530. Port 510, port 520, and port 530 function to transfer data. Each port is shown connected with an interface 570. The interface 570 is, in one embodiment, an interface into ingress packet processing circuitry 212 described above. The following description applies equally to each port and residue counter.

An overshoot value is maintained by residue counter 540. Therefore, each port is associated with an overshoot value. The overshoot value may initially be set to zero, but may fluctuate from cycle to cycle, as will be explained below. The overshoot value is maintained from cycle to cycle, so that the state of the overshoot value during the current cycle may be accessible during a later cycle.

Port 510 transfers data during a cycle. In a cycle, each port will take a turn transferring data to interface 570. So, for example, in a cycle, port 510 will transfer, port 520 will transfer, and port 530 will transfer. Port 510 transfers data during a current cycle until a predetermined number of bytes less an overshoot value for that port has been transferred on port 510. The predetermined number of bytes is in one embodiment 32 bytes. In one embodiment, packets larger than this number are divided up into smaller packets so that each packet is no larger than this predetermined number of bytes. However, these smaller packets may still vary in sizes less than the predetermined number.

It is possible that when the predetermined number of bytes less the overshoot value has been transferred during the current cycle that a packet being transferred on the port will only be partially transferred; that is, some of the bytes of the packet may remain to be transferred before the end of the packet has been reached. In an embodiment, port 510 continues to transfer data even after the predetermined number of bytes less the overshoot value has been reached until a complete packet has been transferred on port 510; that is, until an end of packet has been reached. If a complete packet is transferred on port 510 at the same time that the predetermined number of bytes less the overshoot value is transferred on port 510, that is, if an end of packet is reached at that time, then no more bytes will be transferred on port 510 during the cycle. During the next cycle, port 510 may transfer again.

After port 510 has transferred the predetermined number of bytes less the overshoot value for port 510 during the current cycle, and after port 510 has transferred a complete packet at or beyond that time during the current cycle so that no partial packet remains to be transferred, then residue counter 540 updates the overshoot value for port 510 based on the number of bytes transferred on port 510 during the current cycle. The manner in which residue counter 540 updates the overshoot value associated with port 510 is now described in greater detail.

In one embodiment, residue counter 540, to update the overshoot value for port 510, sets the overshoot value for port 510 to the number of bytes transferred on port 510 in excess of the predetermined number less the overshoot value for port 510 upon determining that the number of bytes transferred on port 510 is greater than the predetermined number of bytes less the overshoot value for port 510. In one embodiment, residue counter 540, to update the overshoot value for port 510, sets the overshoot value for port 510 to zero upon determining that the number of bytes transferred on port 510 is not greater than (i.e., is less than or equal to) the predetermined number of bytes less the overshoot value for port 510.

In one embodiment, if the number of bytes transferred on port 510 is not greater than the predetermined number of bytes less the overshoot value for port 510 only because port 510 did not have any data to transfer during the current cycle, then residue counter 540 does not update the overshoot value for port 510. In other words, residue counter 540 does not set the overshoot value for port 510 to zero under such circumstances in one embodiment.

In one embodiment, if the number of bytes transferred on port 510 is not greater than the predetermined number of bytes less the overshoot value for port 510, then residue counter 540 reduces, up to a predetermined limit, the overshoot value for port 510 by the number of bytes transferred by port 510 during the current cycle less than the predetermined number of bytes less the overshoot value for port 510. In this embodiment, residue counter 540 may set the overshoot value for port 510 to a negative amount. In other words, residue counter 540 may update an undershoot value for port 510 under such circumstances in one embodiment. In one embodiment, this occurs when port 510 transfers less than the predetermined number of bytes less the overshoot value for port 510 during a cycle because port 510 had no more packets to transfer before the end of the cycle.

In one embodiment, if the number of bytes transferred on port 510 is not greater than the predetermined number of bytes less the overshoot value for port 510, then residue counter 540 reduces the overshoot value for port 510 by the number of bytes transferred by port 510 during the current cycle less than the predetermined number of bytes less the overshoot value for port 510. But if this would result in a negative value, then the predetermined number of bytes is added, yielding a positive value less than the predetermined number of bytes. This is comparable to a "byte odometer" which is incremented each cycle by the number of bytes transferred on the port, and which "rolls over."

In one embodiment, multiple ports are present. In one embodiment, an Nth port is coupled to an Nth residue counter. The Nth port is to transfer data during a current cycle until a predetermined number of bytes less an overshoot value for the Nth port has been transferred on the Nth port and to continue to transfer data during the current cycle until a complete packet has been transferred on the Nth port. The Nth residue counter is to update the overshoot value for the Nth port based on the number of bytes transferred on the Nth port.

In one embodiment, the Nth residue counter, to update the overshoot value for the Nth port based on the number of bytes transferred on the Nth port, is to set the overshoot value for the Nth port to the number of bytes transferred on the Nth port in excess of the predetermined number less the overshoot value for the Nth port upon determining that the number of bytes transferred on the Nth port is greater than the predetermined number of bytes less the overshoot value for the Nth port. In one embodiment, the Nth residue counter, to update the overshoot value for the Nth port based on the number of bytes transferred on the Nth port, is to set the overshoot value for the Nth port to zero upon determining that the number of bytes transferred on the Nth port is not greater than the predetermined number of bytes less the overshoot value for the Nth port.

In one embodiment, if the number of bytes transferred on the Nth port is not greater than the predetermined number of bytes less the overshoot value for the Nth port only because the Nth port did not have any data to transfer during the current cycle, then the Nth residue counter does not update the overshoot value for the Nth port. In other words, the Nth residue counter does not set the overshoot value for the Nth port to zero under such circumstances in one embodiment.

In one embodiment, if the number of bytes transferred on the Nth port is not greater than the predetermined number of bytes less the overshoot value for the Nth port, then the Nth residue counter reduces, up to a predetermined limit, the overshoot value for the Nth port by the number of bytes transferred by the Nth port during the current cycle less than the predetermined number of bytes less the overshoot value for the Nth port. In this embodiment, the Nth residue counter may set the overshoot value for the Nth port to a negative amount. In other words, the Nth residue counter may update an undershoot value for the Nth port under such circumstances in one embodiment. In one embodiment, this occurs when the Nth port transfers less than the predetermined number of bytes less the overshoot value for the Nth port during a cycle because the Nth port had no more packets to transfer before the end of the cycle.

In one embodiment, if the number of bytes transferred on the Nth port is not greater than the predetermined number of bytes less the overshoot value for the Nth port, then the Nth residue counter reduces the overshoot value for the Nth port by the number of bytes transferred by the Nth port during the current cycle less than the predetermined number of bytes less the overshoot value for the Nth port. But if this would result in a negative value, then the predetermined number of bytes is added, yielding a positive value less than the predetermined number of bytes.

Figure 6:
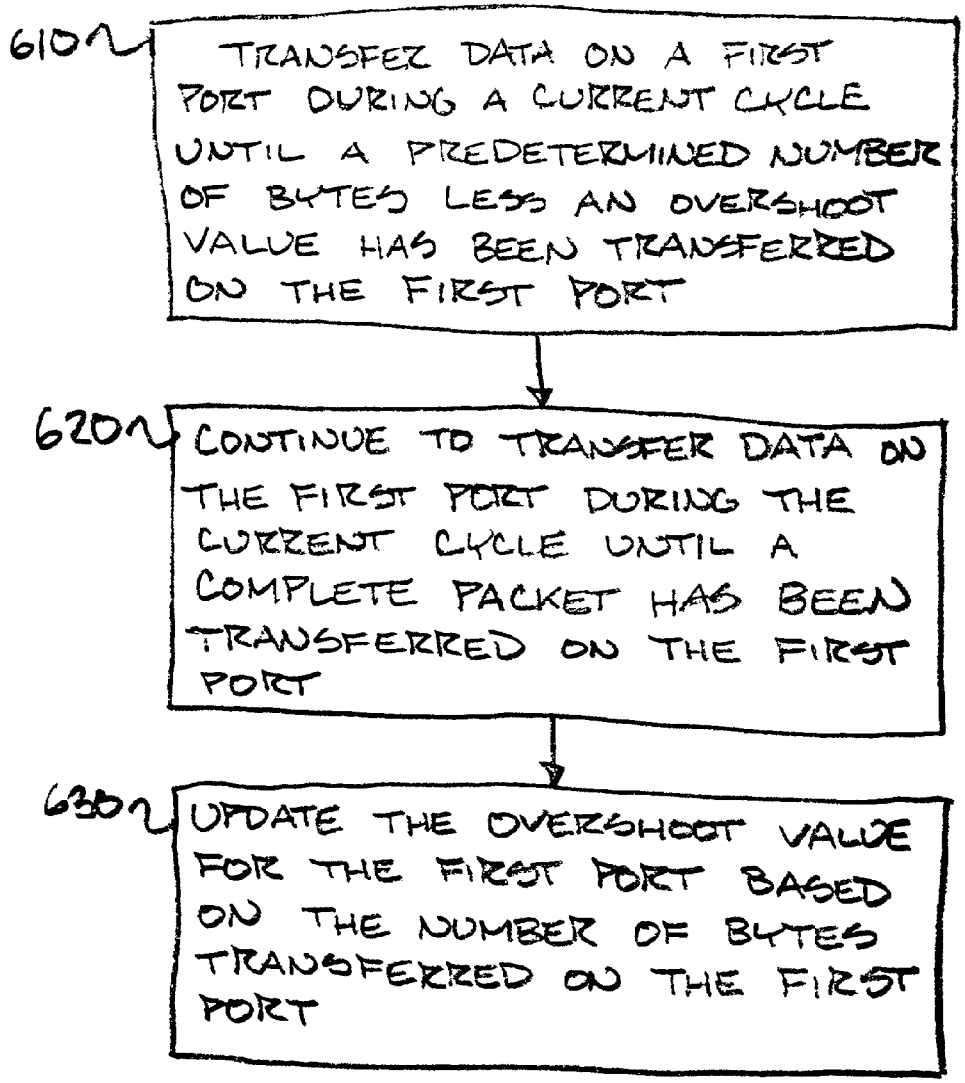
FIG. 6 is a flow diagram illustrating the balancing of bandwidth on a port using an overshoot value according to embodiments of the present invention.

To better illustrate, FIG. 6 is a flow diagram illustrating the balancing of bandwidth on a port using an overshoot value according to embodiments of the present invention. In process block 610, data is transferred on a port during a current cycle until a predetermined number of bytes less an overshoot value for the port has been transferred. In process block 620, the transfer of data is continued on the port during the current cycle until a complete packet has been transferred on the port. In process block 630, the overshoot value for the port is updated based on the number of bytes transferred on the first port.

In one embodiment, updating the overshoot value for the port in process block 630 is accomplished by setting the overshoot value for the port to the number of bytes transferred on the port in excess of the predetermined number less the overshoot value for the port upon determining that the number of bytes transferred on the port is greater than the predetermined number of bytes less the overshoot value for the port. In one embodiment, updating the overshoot value for the port in process block 630 is accomplished by setting the overshoot value for the port to zero upon determining that the number of bytes transferred on the port is not greater than the predetermined number of bytes less the overshoot value for the port.

In one embodiment, if the number of bytes transferred on the port is not greater than the predetermined number of bytes less the overshoot value for the port only because the port did not have any data to transfer during the current cycle, then there is no updating of the overshoot value for the port in process block 630. In other words, there is no setting of the overshoot value for the port to zero in process block 630 under such circumstances in one embodiment. Therefore, in one embodiment, upon determining that a number of bytes transferred on the port during the current cycle is not greater than (i.e., is less than or equal to) the predetermined number of bytes less the overshoot value for the port, then if a packet was not transferred by the first port during the current cycle, then the overshoot value for the port is maintained at the same value, but if a packet was transferred by the port during the current cycle, then overshoot value is set to zero.

In one embodiment, if the number of bytes transferred on the port is not greater than the predetermined number of bytes less the overshoot value for the port, then the updating of the overshoot value for the port includes reducing the overshoot value for the port by the number of bytes transferred by the port during the current cycle less than the predetermined number of bytes less the overshoot value for the port, up to a predetermined limit. In this embodiment, the overshoot value for the port may be set to a negative amount. In other words, the updating of the overshoot value for the port will be an updating of an undershoot value for the port under such circumstances in one embodiment. In one embodiment, this occurs when the port transfers less than the predetermined number of bytes less the overshoot value the port during a cycle because the port had no more packets to transfer before the end of the cycle.

In one embodiment, if the number of bytes transferred on the port is not greater than the predetermined number of bytes less the overshoot value for the port, then the residue counter for the port reduces the overshoot value for the port by the number of bytes transferred by the port during the current cycle less than the predetermined number of bytes less the overshoot value for the port. But if this would result in a negative value, then the predetermined number of bytes is added, yielding a positive value less than the predetermined number of bytes.

In one embodiment, after process block 630 has been completed for a first port, process blocks 610-630 are repeated for a subsequent, or Nth, port during the current cycle. In one embodiment, when process blocks 610-630 have been completed for all of the ports in the network element, then the entire process is started again during a subsequent cycle, beginning again with the first port.

Figure 7:
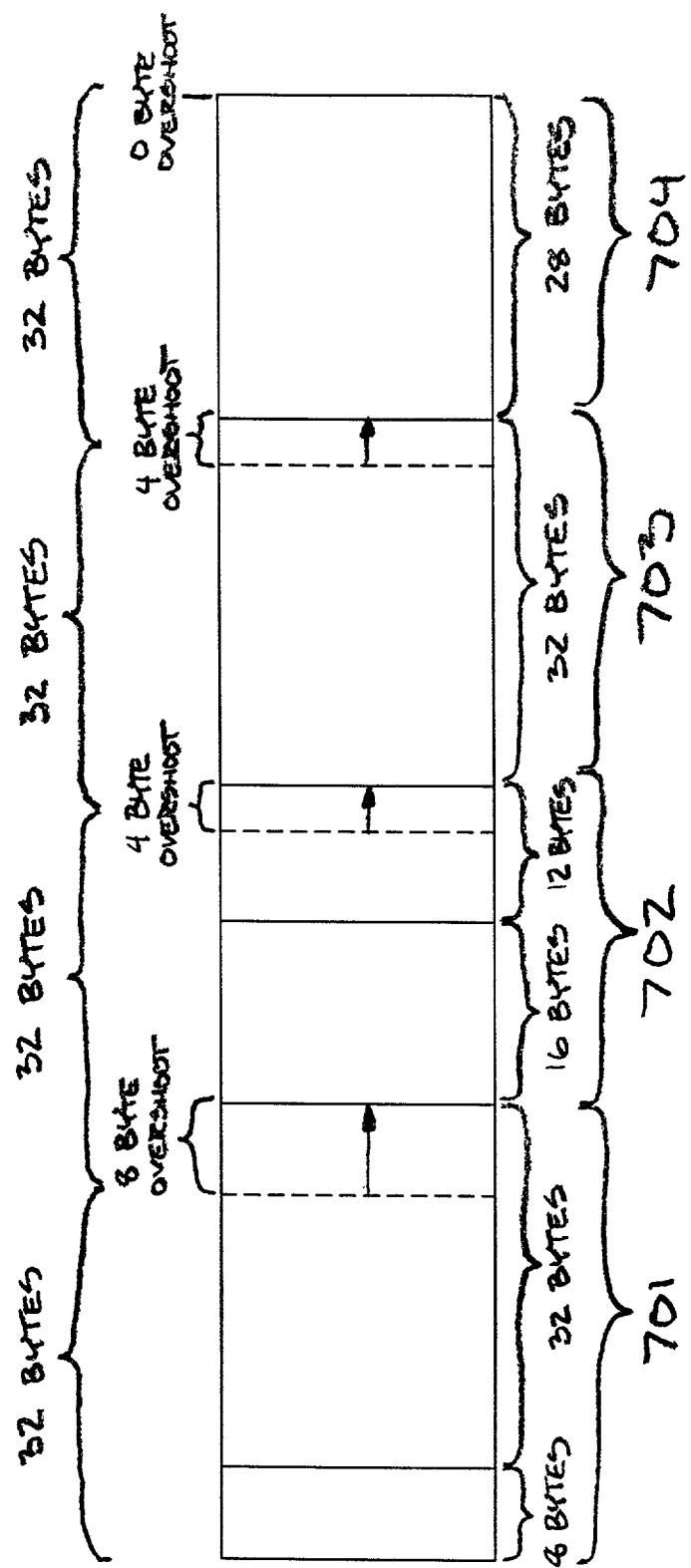
FIG. 7 is a chronological diagram illustrating an example of a port transferring data over multiple cycles according to embodiments of the present invention.

To help illustrate, FIG. 7 is a chronological diagram illustrating an example of a port transferring data over multiple cycles according to embodiments of the present invention. In this example, data packets larger than 32 bytes have been divided into smaller packets no longer than 32 bytes each because the predetermined number of bytes is 32, according to one embodiment. The overshoot number for the exemplary port illustrated is initialized to zero prior to transferring data.

In cycle 701, the port transfers a packet 8 bytes long. Because this is less than the predetermined number of bytes, the port continues to transfer data during cycle 701. The next packet on the port is 32 bytes long. The port transfers the first 24 bytes of this packet before reaching the predetermined number. However, because the packet has not been completely transferred, the port continues to transfer during cycle 701 until all 32 bytes of the packet have been transferred. During cycle 701, the port has transferred a total of 40 bytes, overshooting the predetermined number. Therefore, the overshoot value for the port is set to 8 bytes, which is the number of bytes by which the port overshot the predetermined number during cycle 701. At this time, another port may be allowed to transfer during cycle 701.

In cycle 702, the port transfers a packet 16 bytes long. Because this is less than the predetermined number of bytes (32) less the overshoot value for the port (8), the port continues to transfer data during cycle 702. The next packet on the port is 12 bytes long. The port transfers the first 8 bytes of this packet before reaching the predetermined number less the overshoot value. However, because the packet has not been completely transferred, the port continues to transfer during cycle 702 until all 12 bytes of the packet have been transferred. During cycle 702, the port has transferred a total of 28 bytes, overshooting the predetermined number less the overshoot value for the port. Therefore, the overshoot value for the port is set to 4 bytes, which is the number of bytes by which the port overshot the predetermined number (32) less the already existing overshoot value (8) during cycle 702. At this time, another port may be allowed to transfer during cycle 702.

In cycle 703, the next packet on the port is 32 bytes long. The port transfers the first 28 bytes of this packet before reaching the predetermined number (32) less the overshoot value (4). However, because the packet has not been completely transferred, the port continues to transfer during cycle 703 until all 32 bytes of the packet have been transferred. During cycle 703, the port has transferred a total of 32 bytes, overshooting the predetermined number less the overshoot value for the port. Therefore, the overshoot value for the port is set to (or, in this case, remains at) 4 bytes, which is the number of bytes by which the port overshot the predetermined number (32) less the already existing overshoot value (4) during cycle 703. At this time, another port may be allowed to transfer during cycle 703.

In cycle 704, the next packet on the port is 28 bytes long. The port transfers the 28 bytes of this packet and reaches the predetermined number (32) less the overshoot value (4). The packet has been completely transferred, so the port does not need to continue to transfer data to complete a partially transferred packet. During cycle 704, the port has transferred a total of 28 bytes, matching the predetermined number less the overshoot value for the port. Therefore, the overshoot value for the port is set to zero. At this time, another port may be allowed to transfer during cycle 704, reconciling the disproportionate bandwidth allocation of the past few cycles and balancing the bandwidth among the ports.

Thus, in the above embodiments, ports aggregating channels having large numbers of short packets will receive, on average, as much bandwidth as ports aggregating channels that have longer packets, because transmission by a port needs not end after only one short packet has been sent during a cycle. Consequentially, ingress buffers for such ports will be less likely to overflow due to a lack of bandwidth. Reducing overflow in this manner results in less packet truncation and subsequent retransmission, bettering overall transfer time and helping to provide the quality of service needed by time-critical applications such as video and audio communication applications.

Bandwidth Balancing Using a Bandwidth Balancing Arbiter

Figure 8:
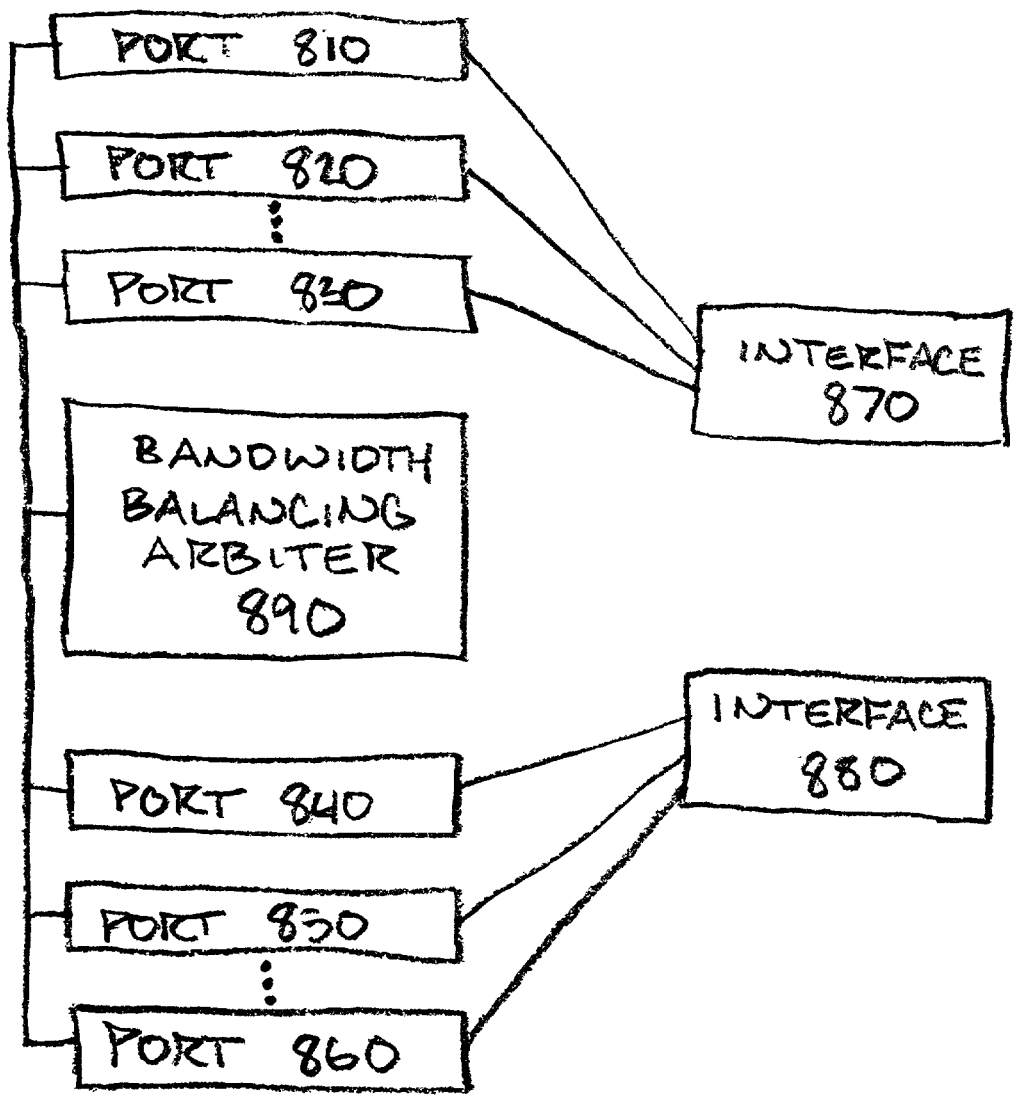
FIG. 8 is a block diagram illustrating ports connected to interfaces and regulated by a bandwidth balancing arbiter according to embodiments of the present invention.

FIG. 8 is a block diagram illustrating ports connected to interfaces and regulated by a bandwidth balancing arbiter according to embodiments of the present invention. In one embodiment, a plurality of ports 810-860 are coupled with a bandwidth balancing arbiter 890. These ports are in one embodiment implemented in register arrays 316 of FIGS. 3 and 4. The bandwidth balancing arbiter 890 is, in one embodiment, implemented in receiving protocol processing unit 306 of FIGS. 3 and 4. The plurality of ports 810-860 is, in one embodiment, one or more pairs of ports where each pair includes a port connected to a first interface 870 and a port connected to a second interface 880. First interface 870 and second interface 880 are in one embodiment implemented in ingress packet processing circuitry 212 of FIGS. 2 through 4. For example, ports 810-830 are shown connected to first interface 870 and ports 840-860 are shown connected to second interface 880. Therefore, one pair of ports might include port 810 and port 840, another pair of ports might include port 820 and port 850, and yet another pair of ports might include port 830 and port 860. Each of these ports is to transfer data during a current cycle.

The bandwidth balancing arbiter 890 is to sequentially select each pair of ports (e.g., port 810 and port 840, then port 820 and port 850, and then port 830 and port 860) of the plurality of pairs of ports to transfer data during the current cycle. Selecting the ports in this manner reduces potential delay between interface 870 transferring and interface 880 transferring.

In one embodiment, the plurality of pairs of ports also includes one pair of ports including a port reserved for maintenance data links ("MDLs") and a port reserved for facility data links ("FDLs"). In one embodiment, port 810 is a port reserved for MDLs and port 820 is a port reserved for FDLs. In one embodiment, port 810 and port 820 are reserved for both MDLs and FDLs. These ports in one embodiment have more channels aggregated to them than do the other ports. This arrangement helps ensure that these ports are provided with a sufficient share of bandwidth. In one embodiment in which port 810 and port 820 are reserved, port 810 and port 820 are not included in the plurality of pairs of ports, but exist separately from the plurality of pairs of ports. In that embodiment, port 810 and port 820 are each still to transfer data during a current cycle, but they are excepted from the scheme described above in which bandwidth balancing arbiter 890 is to sequentially select each pair of ports. So, for example, port 810 would transfer, and then port 820 would transfer, and then the sequentially selected pairs of ports would each transfer, ports 810 and 820 excluded. Typically, ports reserved for MDLs and FDLs have a lesser volume of data to transfer, and thus may be exempted from the pairing scheme while still receiving protection from starvation due to residue counters associated with those ports.

While two interfaces and pairs of ports are described in the embodiment above, one skilled in the art will appreciate that more than two interfaces may be provided, each interface connected with a corresponding set of ports. In such embodiments, rather than selecting pairs of ports, the bandwidth balancing arbiter 890 is to select groups of N ports, where N corresponds to the number of interfaces, and each group may include a port from each set of ports connected to a distinct interface. So, for example, in an embodiment having three interfaces, the bandwidth balancing arbiter is to sequentially select a first group of three ports, the first group including a port connected to the first interface, a port connected to the second interface, and a port connected to the third interface; then a second group of three ports, the second group including a port connected to the first interface, a port connected to the second interface, and a port connected to the third interface, and so forth. Interface 870 and interface 880 are, in one embodiment, PPAs. Interface 870 and interface 880 are, in one embodiment, included in ingress packet processing circuitry 212a-d described above.

Figure 9:
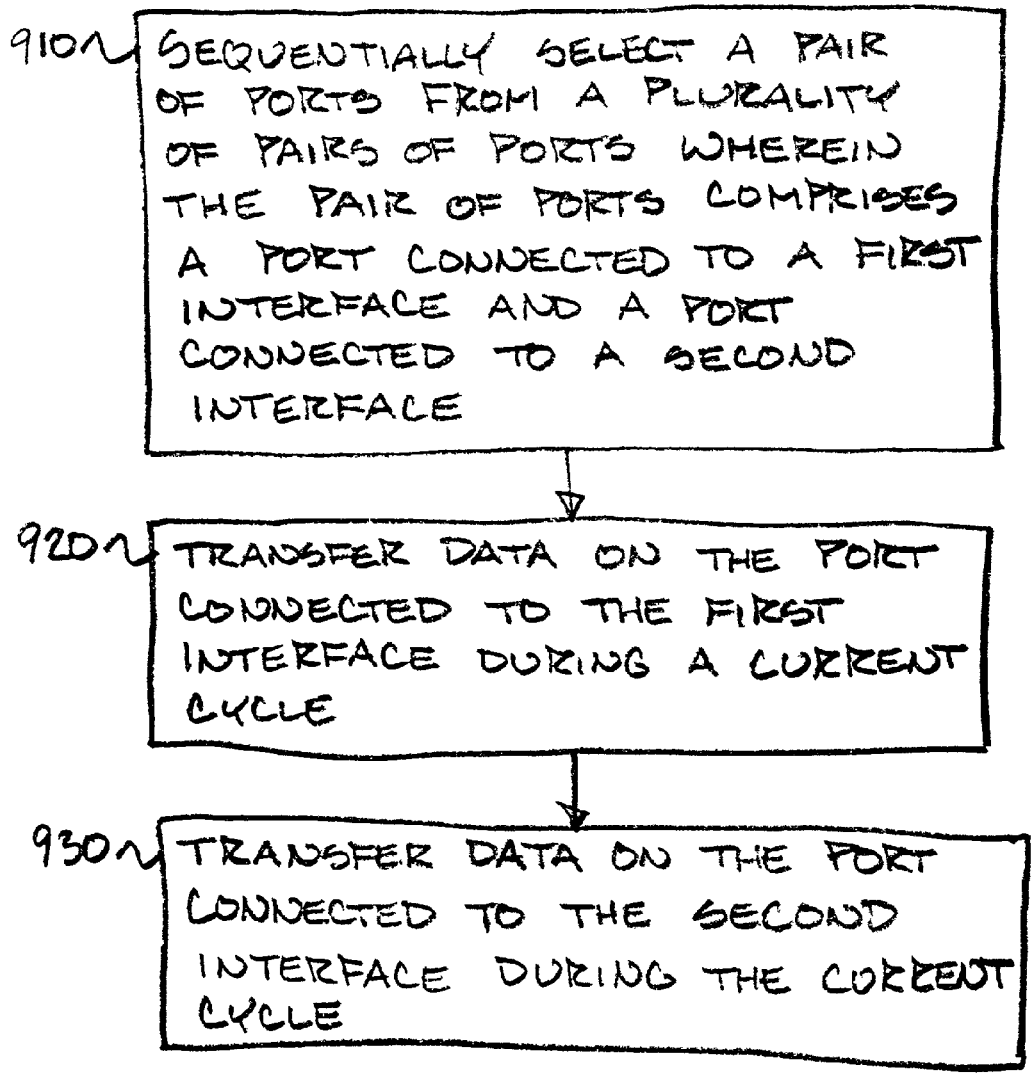
FIG. 9 is a flow diagram illustrating the balancing of bandwidth among interfaces connected to set of ports according to embodiments of the present invention.

FIG. 9 is a flow diagram illustrating the balancing of bandwidth among interfaces connected to set of ports according to embodiments of the present invention. In process block 910, a pair of ports are sequentially selected from a plurality of pairs of ports wherein the pair of ports comprises a port connected to a first interface and a port connected to a second interface. In process block 920, data is transferred on the port connected to the first interface during a current cycle. In process block 930, data is transferred on the port connected to the second interface during the current cycle. In one embodiment, one pair of ports of the plurality of pairs of ports includes a port reserved for MDLs and a port reserved for FDLs. In one embodiment, these reserved ports, though connected to an interface, are excluded from the plurality of pairs of ports as described herein.

Figure 10:
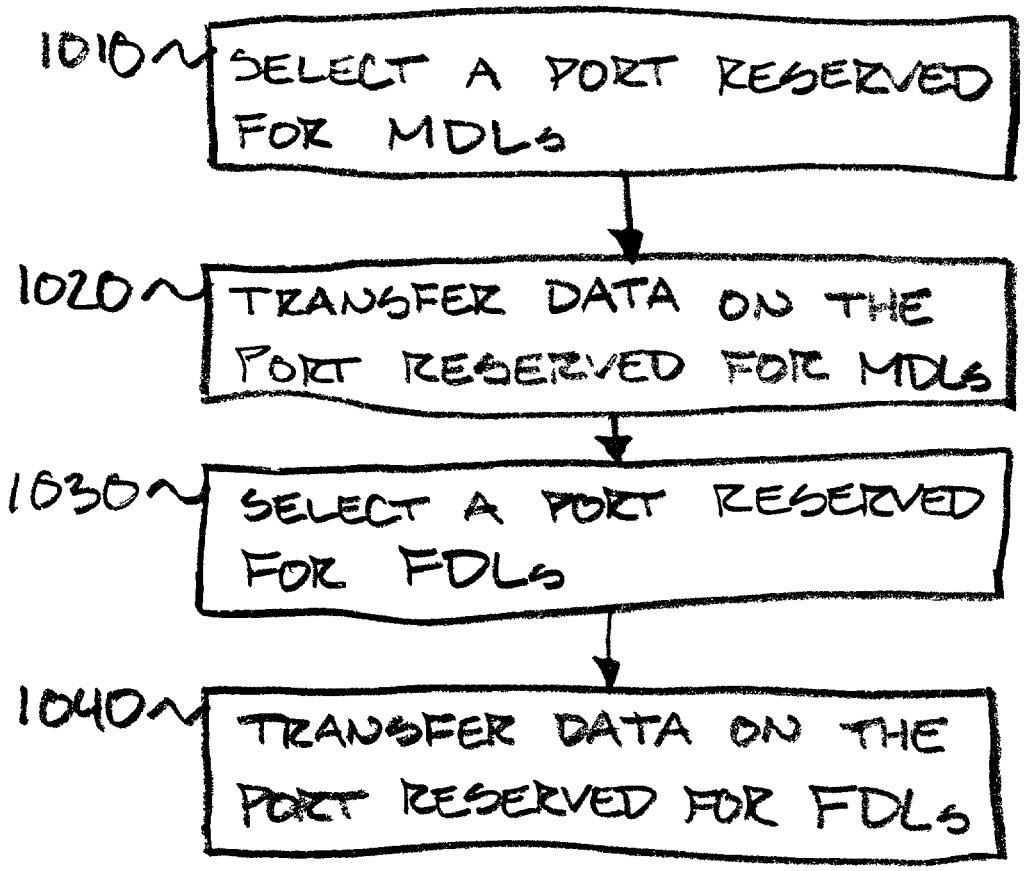
FIG. 10 is a flow diagram illustrating the transfer of data on reserved ports according to embodiments of the present invention.

FIG. 10 is a flow diagram illustrating the transfer of data on reserved ports according to embodiments of the present invention. In process block 1010, a port reserved for MDLs is selected. In process block 1020, data is transferred on the port reserved for MDLs. In process block 1030, a port reserved for FDLs is selected. In process block 1040, data is transferred on the port reserved for FDLs. It is clear that a port reserved for MDLs may transfer before a port reserved for FDLs, or that more than one port may be reserved for both MDLs and FDLs. In one embodiment, transfer of data on sequentially selected pairs of ports, as described with reference to FIG. 9, takes place after process block 1040.

Thus, in the above embodiments, interfaces connected to sets of ports transfer with greater frequency than if all of the ports connected to one interface were forced to transfer packets before the next interface was given a turn to transfer. This helps to reduce undesirably long gaps between bursts of data transmission, which consequentially produces a more steady, constant flow of data. In time-critical applications such as audio and visual communication applications, a more steady, constant data flow assures a user that the application continues to function, and may be more acceptable and pleasing to the user than a more bursty, jolting transmission.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; or flash memory devices.

Thus, a method and apparatus for balancing bandwidth among multiple ports has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:

transferring data on a first port during a current cycle until a predetermined number of bytes less an overshoot value for the first port has been transferred on the first port;

continuing to transfer data on the first port during the current cycle until a complete packet has been transferred on the first port; and updating the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

2. The method of claim 1, wherein the updating of the overshoot value for the first port based on the number of bytes transferred on the first port comprises:

upon determining that the number of bytes transferred on the first port is greater than the predetermined number of bytes less the overshoot value for the first port, setting the overshoot value for the first port to the number of bytes transferred on the first port in excess of the predetermined number less the overshoot value for the first port.

3. The method of claim 1, wherein the updating of the overshoot value for the first port based on the number of bytes transferred on the first port comprises:

upon determining that the number of bytes transferred on the first port is not greater than the predetermined number of bytes less the overshoot value for the first port, setting the overshoot value for the first port to zero.

4. The method of claim 1, further comprising:
transferring data on an Nth port during a current cycle until a predetermined number of bytes less an overshoot value for the Nth port has been transferred on the Nth port;
continuing to transfer data on the Nth port during the current cycle until a complete packet has been transferred on the Nth port; and
updating the overshoot value for the Nth port based on the number of bytes transferred on the Nth port.

5. The method of claim 4, wherein the updating of the overshoot value for the Nth port based on the number of bytes transferred on the Nth port comprises:
upon determining that the number of bytes transferred on the Nth port is greater than the predetermined number of bytes less the overshoot value for the Nth port, setting the overshoot value for the Nth port to the number of bytes transferred on the Nth port in excess of the predetermined number less the overshoot value for the Nth port.

6. The method of claim 4, wherein the updating of the overshoot value for the Nth port based on the number of bytes transferred on the Nth port comprises:
upon determining that the number of bytes transferred on the Nth port is not greater than the predetermined number of bytes less the overshoot value for the Nth port, setting the overshoot value for the Nth port to zero.

7. A method comprising:
upon determining that a number of bytes transferred on a first port during a current cycle is not greater than a predetermined number of bytes less an overshoot value for the first port and a packet was not transferred by the first port during the current cycle, maintaining the overshoot value for the first port; and
upon determining that a number of bytes transferred on a first port during a current cycle is not greater than the predetermined number of bytes less the overshoot value for the first port and a packet was transferred by the first port during the current cycle, setting the overshoot value to zero, the overshoot value to be used to balance bandwidth on the first port during a subsequent cycle.

8. A method comprising:
upon determining that a packet may be transferred on a first port during a current cycle, transferring data on the first port during the current cycle until a predetermined number of bytes less an overshoot value for the first port has been transferred on the first port;
upon determining that a packet has been partially transferred on the first port during the current cycle, continuing to transfer data on the first port during the current cycle until a complete packet has been transferred on the first port; and
updating the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

9. The method of claim 8, wherein the updating of the overshoot value for the first port based on the number of bytes transferred on the first port comprises:
upon determining that the number of bytes transferred on the first port is not greater than the predetermined number of bytes less the overshoot value for the first port, reducing up to a predetermined limit the overshoot value for the first port by the number of bytes transferred on the first port during the current cycle less than the predetermined number of bytes less the overshoot value for the first port.

10. A method comprising:
upon determining that the number of bytes transferred on a first port during a current cycle is not greater than a predetermined number of bytes less an overshoot value for the first port, reducing the overshoot value for the first port by a number of bytes transferred by the first port during the current cycle less than the predetermined number of bytes less the overshoot value for the first port; and
upon determining that the reducing would cause the overshoot value for the first port to become negative, adding the predetermined number of bytes to the overshoot value for the first port.

11. A method comprising:
sequentially selecting a pair of ports from a plurality of pairs of ports, the plurality of pairs of ports comprising a first plurality of ports included in a first interface and a second plurality of ports included in a second interface, wherein the pair of ports comprises a port connected to the first interface and a port connected to the second interface; transferring data on the port connected to the first interface during a current cycle; and transferring data on the port connected to the second interface during the current cycle; and updating the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

12. The method of claim 11, wherein one pair of ports of the plurality of pairs of ports comprises a port reserved for maintenance data links ("MDLs") and a port reserved for facility data links ("FDLs").

13. The method of claim 11, further comprising:
selecting a port reserved for MDLs;
transferring data on the port reserved for MDLs during the current cycle;
selecting a port reserved for FDLs; and
transferring data on the port reserved for FDLs during the current cycle.

14. An apparatus comprising:
a first port to transfer data during a current cycle until a predetermined number of bytes less an overshoot value for the first port has been transferred on the first port and to continue to transfer data during the current cycle until a complete packet has been transferred on the first port; and
a first residue counter coupled with the first port to update the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

15. The apparatus of claim 14, wherein the first residue counter, to update the overshoot value for the first port based on the number of bytes transferred on the first port, is to set the overshoot value for the first port to the number of bytes transferred on the first port in excess of the predetermined number less the overshoot value for the first port upon determining that the number of bytes transferred on the first port is greater than the predetermined number of bytes less the overshoot value for the first port.

16. The apparatus of claim 14, wherein the first residue counter, to update the overshoot value for the first port based on the number of bytes transferred on the first port, is to set the overshoot value for the first port to zero upon determining that the number of bytes transferred on the first port is not greater than the predetermined number of bytes less the overshoot value for the first port.

17. The apparatus of claim 14, wherein the first residue counter, to update the overshoot value for the first port based on the number of bytes transferred on the first port, is to maintain the overshoot value for the first port upon determining that the number of bytes transferred on the first port is not greater than the predetermined number of bytes less the overshoot value for the first port and a packet was not transferred by the first port during the current cycle, and is to set the overshoot value to zero upon determining that the number of bytes transferred on the first port is not greater than the predetermined number of bytes less the overshoot value for the first port and a packet was transferred by the first port during the current cycle.

18. The apparatus of claim 14, wherein the first residue counter, to update the overshoot value for the first port based on the number of bytes transferred on the first port, is to reduce up to a predetermined limit the overshoot value for the first port by the number of bytes transferred on the first port during the current cycle less than the predetermined number of bytes less the overshoot value for the first port upon determining that the number of bytes transferred on the first port is not greater than the predetermined number of bytes less the overshoot value for the first port.

19. The apparatus of claim 14, further comprising:
an Nth port to transfer data during a current cycle until a predetermined number of bytes less an overshoot value for the Nth port has been transferred on the Nth port and to continue to transfer data during the current cycle until a complete packet has been transferred on the Nth port; and
an Nth residue counter coupled with the Nth port to update the overshoot value for the Nth port based on the number of bytes transferred on the Nth port.

20. The apparatus of claim 19, wherein the Nth residue counter, to update the overshoot value for the Nth port based on the number of bytes transferred on the Nth port, is to set the overshoot value for the Nth port to the number of bytes transferred on the Nth port in excess of the predetermined number less the overshoot value for the Nth port upon determining that the number of bytes transferred on the Nth port is greater than the predetermined number of bytes less the overshoot value for the Nth port.

21. The apparatus of claim 19, wherein the Nth residue counter, to update the overshoot value for the Nth port based on the number of bytes transferred on the Nth port, is to set the overshoot value for the Nth port to zero upon determining that the number of bytes transferred on the Nth port is not greater than the predetermined number of bytes less the overshoot value for the Nth port.

22. An apparatus comprising:
a plurality of pairs of ports wherein a pair of ports comprises a port connected to a first interface to transfer data during a current cycle and a port connected to a second interface to transfer data during the current cycle;
a bandwidth balancing arbiter coupled with the plurality of ports to sequentially select each pair of ports of the plurality of pairs of ports to transfer data during the current cycle; and
a pair of reserved ports connected to the first interface, wherein the pair of reserved ports are to transfer data during the current cycle before each pair of ports selected by the bandwidth balancing arbiter.

23. The apparatus of claim 22, wherein the plurality of pairs of ports further comprises one pair of ports comprising a port reserved for maintenance data links ("MDLs") and a port reserved for facility data links ("FDLs").

24. The apparatus of claim 22, further comprising:
a port reserved for MDLs; and
a port reserved for FDLs.

25. A computer-readable medium that stores instructions that, when executed by a computer, cause the computer to perform operations comprising:
transferring data on a first port during a current cycle until a predetermined number of bytes less an overshoot value for the first port has been transferred on the first port;
continuing to transfer data on the first port during the current cycle until a complete packet has been transferred on the first port; and
updating the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

26. The computer-readable medium of claim 25, wherein the updating of the overshoot value for the first port based on the number of bytes transferred on the first port comprises:
upon determining that the number of bytes transferred on the first port is greater than the predetermined number of bytes less the overshoot value for the first port, setting the overshoot value for the first port to the number of bytes transferred on the first port in excess of the predetermined number less the overshoot value for the first port.

27. The computer-readable medium of claim 25, wherein the updating of the overshoot value for the first port based on the number of bytes transferred on the first port comprises:
upon determining that the number of bytes transferred on the first port is not greater than the predetermined number of bytes less the overshoot value for the first port, setting the overshoot value for the first port to zero.

28. The computer-readable medium of claim 25, wherein operations further comprise:
transferring data on an Nth port during a current cycle until a predetermined number of bytes less an overshoot value for the Nth port has been transferred on the Nth port;
continuing to transfer data on the Nth port during the current cycle until a complete packet has been transferred on the Nth port; and
updating the overshoot value for the Nth port based on the number of bytes transferred on the Nth port.

29. The computer-readable medium of claim 28, wherein the updating of the overshoot value for the Nth port based on the number of bytes transferred on the Nth port comprises:

upon determining that the number of bytes transferred on the Nth port is greater than the predetermined number of bytes less the overshoot value for the Nth port, setting the overshoot value for the Nth port to the number of bytes transferred on the Nth port in excess of the predetermined number less the overshoot value for the Nth port.

30. The computer-readable medium of claim 28, wherein the updating of the overshoot value for the Nth port based on the number of bytes transferred on the Nth port comprises:
upon determining that the number of bytes transferred on the Nth port is not greater than the predetermined number of bytes less the overshoot value for the Nth port, setting the overshoot value for the Nth port to zero.

31. A computer-readable medium that stores instructions that, when executed by a computer, cause the computer to perform operations comprising:
upon determining that a number of bytes transferred on a first port during a current cycle is not greater than a predetermined number of bytes less an overshoot value for the first port and a packet was not transferred by the first port during the current cycle, maintaining the overshoot value for the first port; and
upon determining that a number of bytes transferred on a first port during a current cycle is not greater than the predetermined number of bytes less the overshoot value for the first port and a packet was transferred by the first port during the current cycle, setting the overshoot value to zero, the overshoot value to be used to balance bandwidth on the first port during a subsequent cycle.

32. A computer-readable medium that stores instructions that, when executed by a computer, cause the computer to perform operations comprising:
upon determining that a packet may be transferred on a first port during a current cycle, transferring data on the first port during the current cycle until a predetermined number of bytes less an overshoot value for the first port has been transferred on the first port;
upon determining that a packet has been partially transferred on the first port during the current cycle, continuing to transfer data on the first port during the current cycle until a complete packet has been transferred on the first port; and
updating the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

33. The computer-readable medium of claim 32, wherein the updating of the overshoot value for the first port based on the number of bytes transferred on the first port comprises:
upon determining that the number of bytes transferred on the first port is not greater than the predetermined number of bytes less the overshoot value for the first port, reducing up to a predetermined limit the overshoot value for the first port by the number of bytes transferred on the first port during the current cycle less than the predetermined number of bytes less the overshoot value for the first port.

34. A computer-readable medium that stores instructions that, when executed by a computer, cause the computer to perform operations comprising:

sequentially selecting a pair of ports from a plurality of pairs of ports, the plurality of pairs of ports comprising a first plurality of ports included in a first interface and a second plurality of ports included in a second interface, wherein the pair of ports comprises a port connected to the first interface and a port connected to the second interface; transferring data on the port connected to the first interface during a current cycle; and transferring data on the port connected to the second interface during the current cycle; and updating the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

35. The computer-readable medium of claim 34, wherein one pair of ports of the plurality of pairs of ports comprises a port reserved for maintenance data links ("MDLs") and a port reserved for facility data links ("FDLs").

36. The computer-readable medium of claim 34, wherein operations further comprise:
selecting a port reserved for MDLs;
transferring data on the port reserved for MDLs during the current cycle;
selecting a port reserved for FDLs; and
transferring data on the port reserved for FDLs during the current cycle.

37. A computer-readable medium that stores instructions that, when executed by a computer, cause the computer to perform operations comprising:
upon determining that the number of bytes transferred on a first port during a current cycle is not greater than a predetermined number of bytes less an overshoot value for the first port, reducing the overshoot value for the first port by a number of bytes transferred by the first port during the current cycle less than the predetermined number of bytes less the overshoot value for the first port; and
upon determining that the reducing would cause the overshoot value for the first port to become negative, adding the predetermined number of bytes to the overshoot value for the first port.

38. A network element comprising:
at least one line card coupled to receive data, wherein the at least one line card comprises, a first port to transfer the data during a current cycle until a predetermined number of bytes less an overshoot value for the first port has been transferred on the first port and to continue to transfer the data during the current cycle until a complete packet has been transferred on the first port; and
a first residue counter coupled with the first port to update the overshoot value for the first port based on the number of bytes transferred on the first port in excess of the predetermined number of bytes less the overshoot value, wherein the number of bytes transferred on the first port during the current cycle is in excess of the predetermined number of bytes plus the overshoot value.

39. The network element of claim 38, wherein the first residue counter, to update the overshoot value for the first port based on the number of bytes transferred on the first port, is to set the overshoot value for the first port to the number of bytes transferred on the first port in excess of the predetermined number less the overshoot value for the first port upon determining that the number of bytes transferred on the first port is greater than the predetermined number of bytes less the overshoot value for the first port.

40. The network element of claim 38, wherein the first residue counter, to update the overshoot value for the first port based on the number of bytes transferred on the first port, is to set the overshoot value for the first port to zero upon determining that the number of bytes transferred on the first port is not greater than the predetermined number of bytes less the overshoot value for the first port.

41. The network element of claim 38, wherein the first residue counter, to update the overshoot value for the first port based on the number of bytes transferred on the first port, is to maintain the overshoot value for the first port upon determining that the number of bytes transferred on the first port is not greater than the predetermined number of bytes less the overshoot value for the first port and a packet was not transferred by the first port during the current cycle, and is to set the overshoot value to zero upon determining that the number of bytes transferred on the first port is not greater than the predetermined number of bytes less the overshoot value for the first port and a packet was transferred by the first port during the current cycle.

42. The network element of claim 38, wherein the first residue counter, to update the overshoot value for the first port based on the number of bytes transferred on the first port, is to reduce up to a predetermined limit the overshoot value for the first port by the number of bytes transferred on the first port during the current cycle less than the predetermined number of bytes less the overshoot value for the first port upon determining that the number of bytes transferred on the first port is not greater than the predetermined number of bytes less the overshoot value for the first port.

43. The network element of claim 38, wherein the at least one line card further comprises:
   an Nth port to transfer data during a current cycle until a predetermined number of bytes less an overshoot value for the Nth port has been transferred on the Nth port and to continue to transfer data during the current cycle until a complete packet has been transferred on the Nth port; and
   an Nth residue counter coupled with the Nth port to update the overshoot value for the Nth port based on the number of bytes transferred on the Nth port.

44. The network element of claim 43, wherein the Nth residue counter, to update the overshoot value for the Nth port based on the number of bytes transferred on the Nth port, is to set the overshoot value for the Nth port to the number of bytes transferred on the Nth port in excess of the predetermined number less the overshoot value for the Nth port upon determining that the number of bytes transferred on the Nth port is greater than the predetermined number of bytes less the overshoot value for the Nth port.

45. The network element of claim 43, wherein the Nth residue counter, to update the overshoot value for the Nth port based on the number of bytes transferred on the Nth port, is to set the overshoot value for the Nth port to zero upon determining that the number of bytes transferred on the Nth port is not greater than the predetermined number of bytes less the overshoot value for the Nth port.

46. An network element comprising:
   at least one line card coupled to receive data, wherein the at least one line card comprises, a plurality of pairs of ports wherein a pair of ports comprises a port connected to a first interface to transfer data during a current cycle and a port connected to a second interface to transfer data during the current cycle;
   a bandwidth balancing arbiter coupled with the plurality of ports to sequentially select each pair of ports of the plurality of pairs of ports to transfer data during the current cycle; and
   a pair of reserved ports connected to the first interface, wherein the pair of reserved ports are to transfer data during the current cycle before each pair of ports selected by the bandwidth balancing arbiter.

47. The network element of claim 46, wherein the plurality of pairs of ports further comprises one pair of ports comprising a port reserved for maintenance data links ("MDLs") and a port reserved for facility data links ("FDLs").

48. The network element of claim 46, wherein the at least one line card further comprises:
   a port reserved for MDLs; and
   a port reserved for FDLs.

* * * * *